Figure 1:
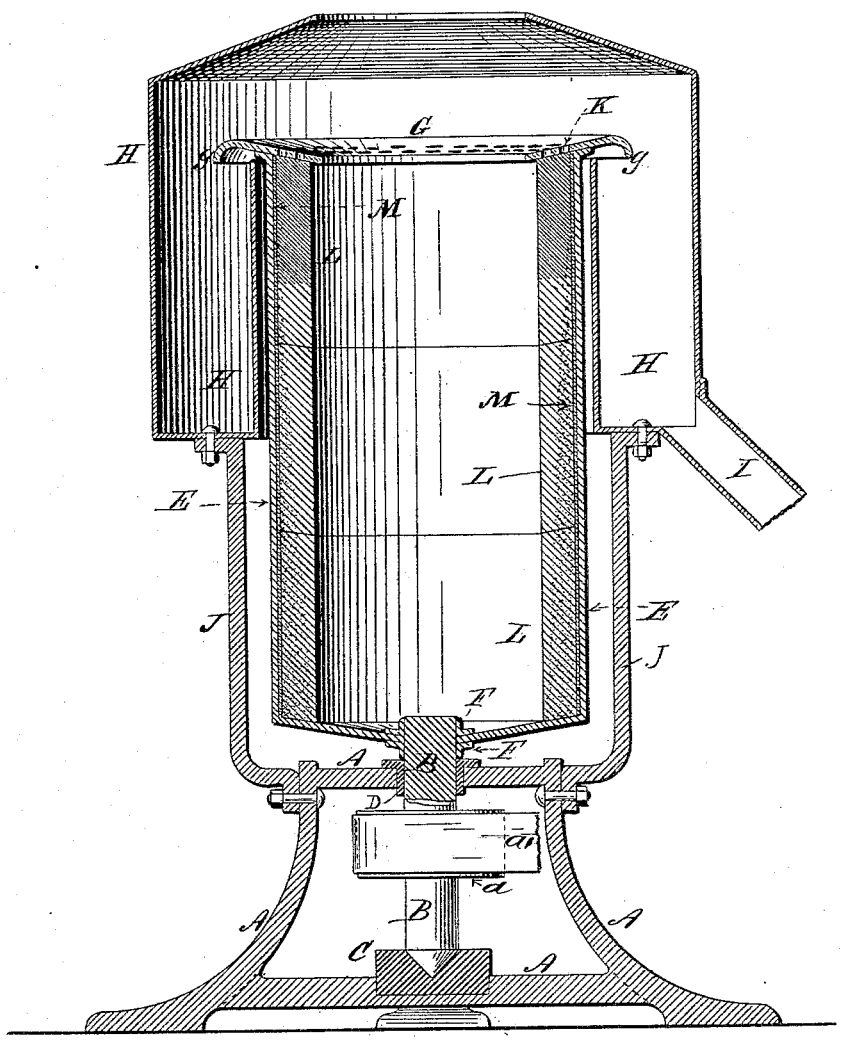

(No Model.) 2 Sheets—Sheet 1.

R. L. DE LISSER.
CENTRIFUGAL FILTER.

No. 387,865. Patented Aug. 14, 1888.

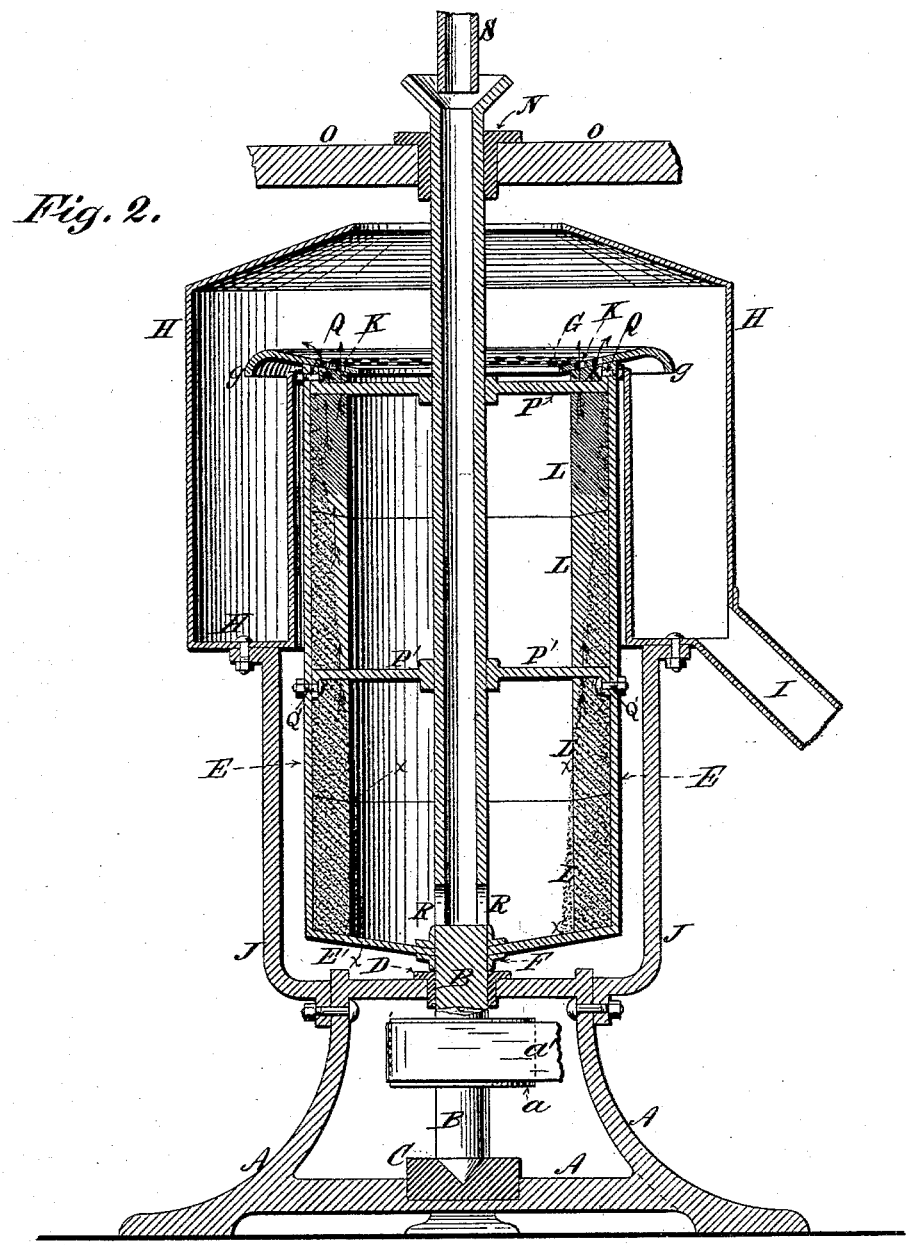

UNITED STATES PATENT OFFICE.

RICHARD L. DE LISSER, OF BROOKLYN, NEW YORK, ASSIGNOR TO THE CENTRIFUGAL FILTER COMPANY, OF NEW YORK.

CENTRIFUGAL FILTER.

SPECIFICATION forming part of Letters Patent No. 387,865, dated August 14, 1888.

Application filed April 27, 1887. Serial No. 236,278. (No model.)

*To all whom it may concern:*

Be it known that I, RICHARD L. DE LISSER, a citizen of the United States, and a resident of Brooklyn, in the county of Kings and State of New York, have invented certain new and useful Improvements in Centrifugal Filters, of which the following is a specification.

My invention relates to improvements in centrifugal filters; and, more specifically stated, it consists in constructing the filter with a solid bottom and with walls impervious to the liquid being filtered, so that the laws of centrifugal force and the laws governing bodies having different specific gravities are availed of for separating the impurities from the liquid to be filtered.

When a liquid is thrown into a rapidly-revolving receptacle which is set vertically (especially if it be substantially cylindrical in shape) and revolved on its axis, the liquid in the first instance flies to the outer walls of the receptacle, and then, if prevented from passing through the walls, it is forced upwardly in spiral lines until it reaches the top of the receptacle, and then flies off tangentially over its upper edge. The height to which the liquid will rise, and its volume also, depends upon the limpidity of the liquid and the degree of centrifugal force—in other words, the speed at which the vessel is revolved. Moreover, almost all the impurities contained in liquids which require filtration are "sediments," so called, and have greater specific gravity than the liquids themselves. There are, however, certain impurities which are of the same or less specific gravity than the liquids themselves.

By my invention I am enabled to utilize the above-stated characteristics, and thus secure the purification of the liquids in an effective and speedy manner.

In the drawings the same reference-letters indicate the same parts in all the figures.

Figure 1 illustrates a vertical section of my invention. Fig. 2 illustrates my invention constructed with devices whereby the upper edge of the filter-cylinder may be sustained, to prevent wabbling thereof, and also means for introducing the liquid to the bottom of the filter.

A is a frame, made of any suitable material, upon which the filter is supported.

B is the shaft or axis which supports the filter. It is journaled in the frame in any suitable manner.

I show a center bearing, C, supported on the frame A, and a collar-bearing, D, also supported on the frame. I do not limit myself to any specific method of constructing these bearings. The speeds being high, those best adapted to the purpose should be employed, and that will depend somewhat upon the size of the machine and other considerations—such as location, &c.—which need not be referred to. The shaft is driven by a pulley, $a$, and belt $a'$, or in any other suitable manner.

E is a cylindrical receptacle, which I will hereinafter call the "receiver," preferably made of sheet or cast metal, although it may be made of wood or other suitable material. It is rigidly attached to the main shaft B at F, and revolves with it.

G is an annular flange rigidly attached to the upper edge of the receiver. It projects inside and preferably, but not necessarily, outside thereof, and preferably has a downward pitch inside of the receiver, the better to hold the lining in place, and its outer edge is preferably turned downwardly, as at $g$. This flange has a series of holes, K, made in it, just inside of the upper edge of the receiver. There may be two or more rows of these holes, if desired. I show two rows in the drawings.

H is an annular gutter to catch the purified liquid. It extends entirely around the receiver E, and is provided with one or more spouts, I, by means of which the purified liquid can be drawn off. The gutter may be supported on rods J, attached to the frame A, or in any other suitable manner.

L is a removable lining, of any suitable substance, adapted to catch and hold the impurities which are separated from the liquid, and also, when desired, adapted to act as a filtering substance at the upper part of the filter for the separation of the impurities having but little specific gravity, as hereinafter explained. I have found that very porous felting of a cheap character—such as is used to retain heat in steam-pipes, being from half an inch to an inch or more in thickness, depending on the size of the filter—answers very well for this purpose. This lining L is placed inside of the receiver E, preferably in ring-like sections, although, if the filter be very large, the several rings may themselves be in a number of sections; and, on the other hand, if the filter be small, the lining may be all in one piece. It is held in place by the centrifugal action and by the bottom of the filter below and the flange G above.

The operation of the filter as thus far described is as follows: The machine is started and the liquid poured or allowed to flow into the receiver, preferably first coming in contact therewith on its bottom and near the shaft B. The liquid, as soon as it strikes the bottom of the receiver, is instantly thrown outwardly against the inner face of the lining L and penetrates it, and as the feeding of the liquid continues it rises partly through the porous lining and partly over its face, especially in the lower part of the receiver, until it reaches the flange G at the upper edge thereof. By the time it has reached the flange the liquor is confined to the lining and passes readily through the same, out through the holes K in the flange, and is thrown into the gutter H and is by it carried away. When the liquid first touches the bottom of the receiver and receives the first tangential impulse, those impurities which have the greatest specific gravity retain this impulse most strongly, and they are first projected against the lining L and are embedded in it, and as the liquid rises over the face of the lining and through the interstices in it the same action is continued until finally all the impurities which are heavier than the liquid have been carried to the outside and embedded in or compacted against the lining L. The height of the receiver E is such that these heavy impurities are all separated from the liquid and adhere to the lining in substantially the lower two-thirds thereof, leaving only the impurities having less specific gravity than the liquid to be removed. These light impurities are filtered out by the lining itself acting as a mechanical filtering material during the passage of the liquid through the lining, as illustrated by the arrows in the drawings; and in order that this filtering action may be as complete as possible I sometimes change the character of the uppermost section of the lining L, as compared with the lower parts thereof, and employ a material adapted to filter mechanically. Certain varieties of cloth or felt-like fabrics now well known as filtering agents, or an asbestus filtering material, may be used for the purpose stated in the upper part of the filter.

The special purpose and function of the felt in the lower part of the cylinder are not to have a filtering action, although it serves that purpose to some extent; but it is to act as a place of deposit for the heavier impurities, in and against which they will compact themselves, so that upon removing the lining from the receiver the impurities will come with it, and thus the receiver be cleaned. The impurities can then be washed out of the linings or otherwise removed therefrom. The filter may be run until the sediment not only fills up the interstices in the felt, but also has deposited itself in a layer upon the face of the lining, as illustrated in Fig. 2 at x x.

From the foregoing it will be seen that the filtering action, so far as the heavy impurities are concerned, is performed by centrifugal action plus such filtering effect as the fibrous and porous nature of the lining may have and such part of the water as passes through it, and that the lighter impurities are removed by the straining or filtering action at the upper part of the lining.

If the liquid to be filtered does not contain any impurities of less specific gravity than itself, or if it be not desired to remove them, if they exist, then it is not necessary that the liquid should pass through the lining in the upper part of the filter, and consequently the holes K in the flange G may be omitted. In this instance the heavier impurities will be separated by the centrifugal action and be deposited on and in the lining, and when the perpendicular wall of liquid has reached the flange it will increase in thickness until it reaches the inner edge of the flange, and will then escape over that edge and be thrown into the gutter. The height may be reduced somewhat by flaring the walls outwardly at the upper part of the receiver.

The pressure of the liquid against the walls of the cylinder, especially in the upper part thereof, is very great, so much so that under certain circumstances the liquid will get behind the lining and tend to force it inward and away from the receiver. In order to avoid this, I fasten securely, by sewing or otherwise, to the outside of the lining a backing of material through which the liquid will not freely penetrate—such, for instance, as a tightly-woven canvas or "hard canvas," so called, as shown at M, Fig. 1.

The proportions on which my filters are to be made cannot be given with invariable accuracy, because there are no invariable proportions. They will differ under different conditions, depending on the speed with which the machine is run, the character of the liquid, the character and relative weight of the impurities, and whether or not it is desired to remove the light impurities or only the heavier ones; but I have found, taking water as a standard, and for the removal of both the light and heavy impurities, that if the receiver is thirty inches in diameter the height may be from four to six feet, and the charge or thickness of the wall of liquid at the top of the receiver, assuming a flange to be used, may be from one to one and a half inch thick. Thus a felt of from one to two inches thick may be employed and the speed of revolution for this size filter should be about six hundred to eight hundred revolutions per minute; but, as before stated, I do not limit myself to these dimensions, as they may be considerably departed from and yet result in a practical filter.

If the filters are very large, it is dangerous to run them at the high speed required unless the upper part or rim of the receiver E is sustained in some manner, because if it begins to wabble the charge of liquid at once partakes of the motion and almost instantly something breaks and the parts fly about with great force. I therefore support the upper rim of the receiver and its central part also preferably as shown in Fig. 2. I carry up the shaft B through the center of the receiver and above it, and journal it into a suitable bearing, N, Fig. 2, supported in a suitable frame, O; and I brace the upper edge and medial part of the receiver by means of a suitable number of rods, P P', extending from collars fastened on the shaft to the upper edge and radial part of the receiver and bolted thereto, as seen at Q Q'. The extended part of the shaft I prefer to make tubular, as shown, having orifices R R at or near the bottom of the receiver, so that the liquid may be introduced from a suitable pipe, S, or equivalent device, through this shaft. The shaft may, however, be solid, if preferred, and the liquid introduced by simply pouring it in near the shaft. The stay-rods may be employed either at the top or at the center, or both, as preferred.

I do not limit myself to the details of construction shown, since many alterations therein will readily present themselves to those skilled in this art, and still my invention be employed.

Having described my invention, I claim—

1. The combination of a rotary receiver having a solid bottom and walls, a lining of porous material on the inside of the receiver, a flange projecting inwardly and downwardly from the upper edge of the receiver, and a gutter for receiving and conducting away the purified liquid, substantially as set forth.

2. The combination of a rotary receiver having a solid bottom and walls, a lining of porous material on the inside of the receiver, a flange projecting both inwardly and outwardly from the upper edge of the receiver, and a gutter to conduct away the purified liquid, substantially as set forth.

3. The combination of a rotary receiver having solid walls and bottom, and a continuous circumferential flange attached to and projecting both inside and outside of the upper edge of the receiver, substantially as set forth.

4. The combination of a rotary receiver having solid walls and bottom and a lining of porous material, adapted to catch and retain the sediment, &c., placed on the vertical walls of the receiver and in the lower portion thereof, and a lining of a different kind of porous material, adapted to filter the liquid passing through it, placed at the upper part of the walls of the receiver, substantially as set forth.

5. The combination of a rotary receiver having greater height than diameter, closed at the bottom and having solid walls, a lining of porous material on the inside of the receiver, with a flange at the upper end of the receiver, and means for catching and conveying away the purified liquid, substantially as set forth.

6. The combination of a rotary receiver having greater height than diameter, closed at the bottom and having solid walls, a lining of porous material on the inside of the receiver, and a flange at the upper end of the receiver, having holes in it within the wall of the receiver and outside the inner surface of the lining of the receiver, with means to catch and convey away the purified liquid, substantially as set forth.

7. The combination of a rotary receiver having solid bottom and walls, with a lining placed within the receiver, and a flange at the upper end of the receiver, the lining having a backing of material less pervious than itself to the passage of the liquids firmly adhering to the back side thereof, substantially as set forth.

8. The combination of a rotary receiver having solid walls and bottom, with a continuous circumferential flange attached to the upper edge of the receiver, and a longitudinally bored or recessed shaft which extends through the receiver and on which it rotates, said shaft being provided with openings near its lower end adjacent to the bottom of the receiver, substantially as set forth.

Signed at New York, in the county of New York and State of New York, this 13th day of April, A. D. 1887.

R. L. DE LISSER.

Witnesses:
E. M. DE LISSER,
PHILLIPS ABBOTT.